Patented May 2, 1933

1,906,276

UNITED STATES PATENT OFFICE

HIRAM S. LUKENS, OF PHILADELPHIA, PENNSYLVANIA, ASSIGNOR, BY MESNE ASSIGNMENTS, TO WILLIAM ADAMSON, TRUSTEE

WATER REPELLENT COMPOSITION AND METHOD OF MAKING THE SAME

No Drawing. Application filed June 30, 1926. Serial No. 119,755.

In Patent No. 1,607,405, dated November 16, 1926, under the same title, I have disclosed a method of making water repellent compositions of much commercial value. Such application relates principally to the use of emulsions or colloidal suspensions of waterproofing materials which are cracked or flocculated in place, the emulsion being so prepared and cracked that the cracking or flocculating is irreversible and yields no by-products that are altered by atmospheric agencies or are soluble in or softened by water or that react unfavorably with constituents of the cement. The water repellent substances therein recited are also stable and themselves unaltered by atmospheric agencies or by the constituents of the cement. As examples of the proper water repellent materials I therein refer to petroleum hydrocarbons of the paraffin series as one example, the emulsions or suspensions thereof being cracked either by a constituent of the composition or by a cracking agent which is added. In such application I referred to certain cheap petroleums containing natural emulsifying agents, such as certain sulphonic acids or their derivatives which may be directly mixed up with water to form an emulsion with a solid such as talc in a grinding mill; or the water repellent material such as oil may be dispersed in water by means of aluminum hydroxide or the water repellent material such as oil may be dispersed in a liquid suspension wholly by mechanical agencies, such as by a suitable colloid mill.

In the case of a Sorel cement mixture the cracking or flocculating was carried out by the magnesium chloride of the mixture; and in the case of Portland cement the soluble lime salts of the cement would cause the cracking. Special cracking agents may also be used in cases where such addition is needed. The process was also recited as being applicable to plastic compositions, such as gypsum products, wherein sufficient calcium sulphate dissolves to crack the emulsion.

The present invention relates to an improvement upon said inventions and it consists in forming an emulsion from a solution of a water insoluble solid in a volatile solvent.

For example, if paraffin be dissolved in benzol a liquid solution results. If to this solution there be added an equal volume of a naturally occurring emulsifiable oil a solution results which will form an emulsion or colloidal suspension when added to water. Emulsions as thus made are sufficiently stable for all practical purposes and retain the internal phase in a highly dispersed condition for a sufficient length of time to permit them to be employed in the waterproofing of cement and cement products.

As an example, if the emulsion above recited be added to a mixture such as the following, a product is produced of good structural strength and excellent resistance to disintegration by moisture:

| | Parts |
|---|---|
| Magnesium oxide | 1 |
| Silex | 2 |
| Ottawa sand | 5 |
| Magnesium chloride (with 6 mols. of water of crystallization) | 1 |

The above materials are preferably mixed in the dry condition and a sufficient amount of the above emulsion is added with thorough stirring or mixing until the mass is of about the consistency of common mortar.

As the magnesium chloride of the Sorel mixture enters into solution the emulsion is flocculated and globules of the solution of paraffin and benzol and oil separate. The magnesium chloride and magnesium oxide react in the usual manner of Sorel cements. Benzol evaporates in time and there remains a mixture of paraffin and mineral oil to serve as water repellent constituents of the product.

Instead of dissolving paraffin I may dissolve resin in benzol or other volatile solvent. Likewise, cellulose nitrate or cellulose acetate may be used as the water insoluble agent, either of these materials being dissolved in appropriate volatile solvents such as amyl acetate, acetone or the like.

It will be noted that the above recited water insoluble agents are solids at ordinary temperatures; and I consider myself the first to discover the special advantage of using solutions of such solids to form emulsions as waterproofing constituents of cement products with or without the use of aggregates. Other emulsifying agents may be used provided the water repellent substance is stable and unaltered by atmospheric agencies or by the constituents of the cement and provided the cracking or flocculating is irreversible and yields no by-products that are altered by atmospheric agencies or are soluble in or softened by water or which react injuriously with the constituents of the cement. For example, I may use rosin as an emulsifying agent for solutions of cellulose nitrate. In this case the rosin should be dissolved in alcohol and mixed with the solution of cellulose nitrate. When such a mixture is added to water the dilution of the alcohol by water causes a separation of the solid rosin particles which enter into the inter phase between the internal and external constituents of the emulsion and produce an emulsion of cellulose nitrate solution in water of sufficient stability for the purposes desired.

The method of applying specific emulsifying agents will vary with the plastic mixture and purpose for which it is to be used; and I do not intend to limit myself to the use of naturally occurring emulsifiable oils as emulsifying agents, as other materials may or should be used in certain cases. For example, such materials are unsatisfactory when the process is applied to Portland cement products as they tend to unduly decrease the strength of the product. The water repellent material may be of organic, inorganic or mixed type so long as the same complies with my requirements. As an example of the inorganic type, a solution of salts of iron or aluminum in a volatile solvent may be used, and similarly as an example of the mixed type the stearates or oleates of alkaline earths may be used. The cracking may be carried out either by a constituent of the mixture or by an added cracking agent. Insoluble soaps are undesirable in my process as they produce substances which are unstable and tend to break down by oxidation through the action of atmospheric agencies and the constituents of the cement or combination of both causes.

While the cracking or flocculating is of advantage and desirable, my invention is not intended to be limited thereto since I consider myself the first to form a solution of solids of water insoluble character and then form an emulsion from such solution. By "solids" I of course mean materials which are solid at ordinary temperatures. Plastic materials or articles made in accordance with this method are of special advantage in having excellent structural strength, being highly resistant to disintegration with stable water repellent constituents and with no by-products which are attacked under the conditions of use.

I claim:

1. In the manufacture of cementitious compositions, the steps consisting of mixing an aggregate with binding material, incorporating in the mixture a previously formed emulsion of a solution of a water insoluble solid in a volatile solvent, and cracking the emulsion in the mixture by means of a cracking agent, all of the non-volatile products of cracking being water resistant and stable.

2. As a new article of manufacture, a composition containing the cracked water resistant stable constituents of a previously formed emulsion of a solution of a water insoluble solid in a volatile solvent added to the plastic mixture, all of the non-volatile portions of which are resistant and stable.

3. As a new article of manufacture, aggregates cemented together by binder containing the cracked water resistant stable constituents of a previously formed emulsion of a solution of a water insoluble solid in a volatile solvent added to the plastic mixture, the non-volatile constituents being water resistant and stable and the article having the strength usually required in building materials.

4. In the manufacture of cementitious compositions, the step consisting of adding to magnesia cement mixtures of the general Sorel cement type, a previously formed emulsion of a solution of a naturally solid water-insoluble material dissolved in a volatile solvent.

5. In the manufacture of cementitious compositions, the steps consisting of mixing aggregate with a binder of the general Sorel cement type and incorporating therein a previously formed emulsion of a solution of a naturally solid water insoluble material dissolved in a volatile solvent.

6. As a new article of manufacture, aggregate cemented by a binder of the Sorel type and containing the cracked water-resistant stable constituents of a solution of a solid dissolved in a volatile solvent.

In testimony whereof I have hereunto set my hand.

HIRAM S. LUKENS.

CERTIFICATE OF CORRECTION.

Patent No. 1,906,276.　　　　　　　　　　　　　　　　　　May 2, 1933.

HIRAM S. LUKENS.

It is hereby certified that error appears in the printed specification of the above numbered patent requiring correction as follows: Page 2, line 78, claim 2, after the article "a" second occurrence insert the word "cementitious"; and that the said Letters Patent should be read with this correction therein that the same may conform to the record of the case in the Patent Office.

Signed and sealed this 13th day of June, A. D. 1933.

M. J. Moore.

(Seal)　　　　　　　　　　　　　　　　　　　　　Acting Commissioner of Patents.